US008910504B2

(12) United States Patent
Zlatintsis

(10) Patent No.: US 8,910,504 B2
(45) Date of Patent: Dec. 16, 2014

(54) DEVICE FOR COMPENSATING A FILLING LEVEL

(75) Inventor: Chrysafis Zlatintsis, Lubeck (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 339 days.

(21) Appl. No.: 13/602,960

(22) Filed: Sep. 4, 2012

(65) Prior Publication Data

US 2013/0056229 A1 Mar. 7, 2013

(30) Foreign Application Priority Data

Sep. 7, 2011 (EP) .................................... 11180472

(51) Int. Cl.
*A62C 35/02* (2006.01)
*A62C 35/68* (2006.01)
*G01F 19/00* (2006.01)

(52) U.S. Cl.
CPC ............... *A62C 35/023* (2013.01); *A62C 35/68* (2013.01)
USPC ................................................ 73/1.73; 169/9

(58) Field of Classification Search
CPC ...... A62C 35/023; A62C 35/68; G01F 23/00; G01F 23/02; G01F 23/30
USPC ............ 73/1.73, 290 R–334; 239/74; 169/71, 169/76, 77, 85, 88, DIG. 1; 137/558; 405/54
See application file for complete search history.

(56) References Cited

U.S. PATENT DOCUMENTS 2,748,744 A * 6/1956 Trulove ......................... 116/299
5,588,779 A * 12/1996 Merrett ........................... 405/54

FOREIGN PATENT DOCUMENTS

DE 846303 C 8/1952
DE 3613906 A1 10/1987
DE 10047594 A1 4/2002
DE 10048544 A1 5/2002
DE 112004000270 T5 10/2006
WO 0166269 A1 9/2001

OTHER PUBLICATIONS

European Standard EN 629-1, ICS 23.020.30 “25E taper thread for connection of valves to gas cylinders” English version; Jun. 1996 (10 pages).

* cited by examiner

*Primary Examiner* — Daniel S Larkin
*Assistant Examiner* — Irving A Campbell
(74) *Attorney, Agent, or Firm* — Harness, Dickey & Pierce, P.L.C.

(57) ABSTRACT

A device for compensating a filling level (34) in a pressure vessel (1) for an extinguishing agent, includes an extinguishing line (32), a propellant-gas line (37) supplied with propellant gas (31), and an adapter (3) on a threaded socket of the pressure vessel (1). A compensation tank (30) is in communication with the pressure vessel and a shut-off member (9) is arranged between the compensation tank (30) and the pressure vessel (1). The shut-off member is closed automatically to isolate the compensation tank from the pressure vessel when a propellant is applied to the pressure vessel so that the extinguishing agent can be stored without pressure in the extinguishing-agent vessel and can be monitored using a simple device.

12 Claims, 5 Drawing Sheets

DEVICE FOR COMPENSATING A FILLING LEVEL

CROSS-REFERENCE TO RELATED APPLICATIONS

This application claims the benefit and priority of European Application No. 11180472, filed Sep. 7, 2011, the entire disclosure of which is incorporated herein by reference.

FIELD

The present disclosure relates to a device for compensating a filling level in a pressure vessel for an extinguishing agent.

BACKGROUND

The device of the present disclosure is suitable for pressure vessels for extinguishing agents having an extinguishing liquid that is being expelled by means of a propellant gas from this vessel by a riser to extinguishing lines.

Fire-extinguishing systems of this type are known.

DE 100 48 544 A1 describes a stationary fire-extinguishing system with combined activation and extinguishing line, consisting of an extinguishing-agent vessel having an extinguishing liquid, lines for the extinguishing agent and a propellant-gas vessel having a propellant gas that discharges the extinguishing liquid from the extinguishing-agent vessel into the line for the extinguishing agent. The extinguishing-agent vessel does not feature a compensation tank nor a filling-level display.

99% of the market-standard pressurized-gas cylinders that are used for firefighting techniques exhibit a single threaded socket for example according to DIN EN 629-1-25E.

By providing a suitable interior coating, such cylinders can be converted to water-supply cylinders. Such water-supply cylinders are employed in high-pressure water-fog extinguishing systems.

The small socket of these water-supply cylinders as the only communications opening to the extinguishing medium represents a technical challenge for upgrade solutions that let the water-supply cylinders be upgraded for convenient operation of the fire-extinguishing system.

During operation of the extinguishing system it is expected that the water supply can be checked for wastage and that the thermal influences on the extinguishing liquid caused by the environment such as contraction and expansion can be compensated without any loss.

Pressurized-gas cylinders that are used for gaseous extinguishing agents can be employed as extinguishing-agent vessels. These cylinders are provided with suitable coatings on the inside, and thus water for firefighting can be stored therein protected against corrosion and in the case of a fire is vaporized through suitable nozzles at high pressure for fighting a fire.

Due to variable environmental conditions of these systems, the environmental temperature acts on the stored water such that it changes its volume. The stored water contracts and expands due to changes in temperature. In the case of corresponding environmental conditions (for example in the case of extinguishing lines and open nozzles without valves to the extinguishing-agent vessel) the water can also evaporate.

The prior art is that pressure vessels are filled with liquid extinguishing agents, without compensation tank.

Therefore the necessity for safeguarding the required amounts of extinguishing water or at least of reliably monitoring the required amount of extinguishing water is indispensable.

A problem for monitoring such cylinders consists in the fact that these cylinders only exhibit an extrusion with a threaded socket that just about makes it possible to receive a valve with a riser.

However, changes to such gas cylinders, specifically conversion to water-supply cylinders that potentially can offer further connection possibilities for example for monitoring purposes, would result in high costs for the operating licenses or approvals of the pressurized-gas cylinders.

Another problem consists in the fact that the filling level is monitored inside the extinguishing-agent pressure vessel (inside monitoring in pressure vessels) using only pressure-resistant components (operating pressures of up to several hundred bar). In addition to high costs, also considerable technical effort is involved to transfer the filling-level information out of the pressure vessel.

DE 100 47 594 A1 describes a method and a device for determining the liquid level of a liquid in a vessel. To achieve a reliable display at the critical liquid points, the method dispenses with continually measuring the filling level in the vessel over the entire range, and instead electrodes are disposed in the vessel to determine changes in the filling level and limit values. In this way, filling levels such as “full vessel”, “minimum filling level in the vessel”, and “empty vessel” are defined. To compensate and to document a liquid level in a supply vessel for extinguishing agents, this type of determination of the filling level is unsuitable.

DE 36 13 906 A1 describes a device for content monitoring of expansion tanks subject to a gas pressure and the like, for example heating installations. The device exhibits an expansion tank, the expansion of the liquid in the expansion tank being displayed mechanically or electrically. In this solution, the expansion tank and the corresponding connecting parts exhibit the same pressure resistance, entailing comparable costs.

WO 01/66269 A1 describes a device for determining and/or monitoring a predetermined filling level in a vessel, in which the actual filling level in a vessel is determined by means of oscillations. This device, too, is unsuitable for compensating and measuring the filling level in a supply vessel. Also in this case the monitoring components that are used have to exhibit the pressure resistance of the vessel.

DE 11 2004 000 270 T5 describes the measurement of volumes using pressure, it been possible to pressurize a vessel and sensors for measuring the pressure being arranged inside the vessel. Although the device is suitable to determine a fluid volume in the vessel, it is not suitable to expand it beyond the vessel limit and to determine it. In this case, too, the monitoring components that are used have to feature the pressure resistance of the vessel.

DE-PS 846 303 describes a float-controlled monitoring facility in particular for expansion vessels of heating or cooling installations, where a 3-way cock is arranged below the float vessel, using which the lowering of the liquid level in the expansion vessel can be controlled.

SUMMARY

A solution according to which the extinguishing liquid is to be stored and monitored without pressure in the case of a varying temperature in a pressure vessel such as an extinguishing-agent vessel, is not known in the prior art.

It is therefore the object of the present disclosure to develop a device in which an extinguishing liquid to which a propellant is applied can be stored and monitored without pressure under circumstances of varying temperatures in a pressure vessel for extinguishing agents.

The present disclosure provides a device for compensating a filling level in a pressure vessel for extinguishing agents, that comprises the pressure vessel having the extinguishing agent, the extinguishing line, the propellant-gas line having the propellant gas, and the adapter of the pressure vessel, and a compensation tank having a shut-off member between the compensation tank and the pressure vessel.

The pressure vessel can be made from steel, aluminum, plastic, carbon-fiber reinforced plastic or other suitable materials.

In a preferred embodiment, the pressure vessel can represent a pressurized-gas cylinder that is used for gaseous extinguishing agents and exhibits a suitable inside coating. The upper opening of the gas cylinder can be a threaded socket having a thread that is conventional for this, for example according to DIN EN 629-1-25E. This threaded socket serves to receive an adapter.

The adapter produces a pressure-resistant fluid connection between the pressure vessel and the compensation tank with the shut-off device and the extinguishing line and optionally with the propellant-gas line and optionally with further connections.

In a preferred embodiment, the adapter is a separate component. In a further advantageous design, the adapter is integrated in or on the pressure vessel.

Furthermore it is advantageous for a pipe to be arranged on the adapter, through which pipe a fluid can escape. This pipe can be closed by a non-return valve. Advantageously the non-return valve of the pipe should be situated above the level of the compensation tank or at least at the same level as the upper part or the upper edge of the compensation tank. The pipe can be arranged for example vertically.

The through-flow direction of the non-return valve points in the direction of the extinguishing-agent vessel when a pressure is applied. With no pressure applied, fluid can pass through the non-return valve in both directions.

Opposite the opening for the vertical pipe with the non-return valve, an opening for the propellant gas can be arranged on the adapter.

The compensation tank that is connected to the pressure vessel allows a 100% utilization of the pressure-vessel volume when filling with the extinguishing agent. After filling, the filling level is preferably situated in the compensation tank. There the filling level can optionally be monitored visually by a transparent section at the compensation tank and/or a facility for displaying and/or monitoring the filling level. The volume in the compensation tank above the filling level is dimensioned such that it can compensate for temperature-related changes in volume of the extinguishing agent.

A shut-off member is positioned between the compensation tank and the pressure vessel with the extinguishing agent.

After filling, the system is in a state of rest. After triggering the extinguishing system (triggering state) a propellant gas is applied to the extinguishing agent in the pressure vessel and the shut-off member separates the fluid connection between the compensation tank and the pressure vessel to keep the compensation tank unpressurized.

It is advantageous if the compensation tank represents a pipe between an upper part and a lower part, the pipe exhibiting a transparent wall. This transparent wall enables the filling level to be monitored and read visually and/or optically. The upper and lower parts can be interconnected by means of fastening screws. A seal can be arranged between the upper part and the pipe and the lower part and the pipe.

Other advantageous embodiments of the compensation tank can be of any geometric shape, for example cube shaped or a rectangular parallelepiped. The compensation tank can also be made from one piece or from two parts, the removable upper part and a part that forms the wall and the lower part.

To determine the filling level in the compensation tank it is advantageous, optionally to arrange a facility for displaying and/or monitoring the filling level. To this end, a float can be arranged. It can be in the form of a level float switch that generates and passes on a signal when a very specific filling level of the extinguishing liquid is reached. The filling-level monitoring system can be connected to a monitoring facility, for example a fire detection and/or control panel.

Above the filling level, the compensation tank exhibits at least one opening for pressure compensation. It is further called the upper opening. As a result, the compensation tank stays unpressurized permanently. This unpressurized state in the compensation tank is also ensured by means of the shut-off member.

The at least one opening of the compensation tank can be a bore that is suitable to carry out the pressure compensation above the filling level in the compensation tank. Other shapes of the opening are also possible.

The shut-off member represents a device for decoupling, in terms of pressure, between the pressure vessel that contains the extinguishing agent and a compensation tank arranged outside the pressure vessel that at the same time or optionally represents a facility for displaying and monitoring the filling level in the pressure vessel. In the state of rest, the shut-off member is open and there exists a fluid connection between the pressure vessel and the compensation tank. The shut-off member separates this fluid connection when pressure is applied, for example by means of the propellant gas for discharging the extinguishing agent when the extinguishing system is triggered. This ensures that the extinguishing agent does not get from the extinguishing-agent vessel into the compensation tank when pressure is applied, but is driven out into the extinguishing line to the nozzles.

The shut-off member can also be designed as a non-return valve, for example as a check valve that is closed when pressure is applied that usually originates from the propellant gas. However, the shut-off member can also be designed as a valve that is externally controlled, for example by a fluid or an electric actuator. Electric control or an electric actuator is possible for example by means of the fire detection and/or control panel.

The flow direction of the shut-off member in the design as a non-return valve points in the direction of the extinguishing-agent vessel when pressure is applied. Without pressure applied, the fluid can pass through the shut-off members, when designed as non-return valves, in both directions.

The connections for introducing the propellant gas, for the extinguishing-water line and the vertical pipe can be designed as connecting sockets having a screw connection. From a separate vessel, the propellant gas flows via lines to the adapter and through it and an annular gap in the extinguishing-agent vessel.

A further advantageous design of the present disclosure consists in the fact that a vessel connection for introducing the propellant gas is arranged on the pressure vessel for the extinguishing agent. Using this vessel connection it is possible to introduce the propellant gas directly into the pressure vessel onto the extinguishing agent. The advantage of this solution consists in the fact that only one connection for the extinguishing line has to be present on the side of the adapter, the compensation tank having the shut-off member being arranged on the adapter. If the extinguishing line is routed vertically upward from its connection at the adapter, the same filling level would result in the extinguishing line as in the compensation tank.

If the extinguishing line is routed away horizontally or downward there is to be arranged between the adapter and the connection for the extinguishing line and the extinguishing nozzles a valve that prevents the extinguishing agent from flowing into the extinguishing nozzles before an alarm is triggered.

Filling of the extinguishing-agent vessel can take place through the upper opening of the compensation tank and the non-return valve and the riser. The air escapes from the extinguishing-agent vessel during filling via an opening in the adapter, preferably by a pipe having a non-return valve into the atmosphere. During filling, the air can also escape by means of other suitable openings.

In the event of an increase in temperature, the extinguishing agent expands into the compensation tank, the vertical pipe, if present, and the extinguishing line, which can be detected through a transparent or part-transparent wall of the compensation tank or/and the float or a level float switch and its display.

In a further preferred embodiment, the compensation tank can consist of a non-transparent material and visually monitoring the filling level can take place through the preferably vertical pipe in a transparent or part-transparent design.

In case that the extinguishing liquid is to be expelled into the extinguishing line, a propellant gas flows via a duct about the riser above the extinguishing liquid into the extinguishing-agent vessel and forces the extinguishing agent via the riser, the adapter, and the connection for the extinguishing line, and the extinguishing line to the extinguishing nozzles. In the case of a sudden pressure load the non-return valves are closed so that the extinguishing agent can leave the adapter only in the direction of the connection for the extinguishing line.

The inventive solution has the advantage that the extinguishing liquid, to which a propellant is applied in the triggering state, can be stored without pressure in the operating state in the extinguishing-agent vessel and can be monitored using a simple device. By using the volume in the compensation tank, it is further possible to store a larger extinguishing-agent volume in the pressure vessel, it being possible to use cost-effective, non-pressure resistant components outside the pressure vessel for measuring the filling level.

DRAWINGS

The present disclosure is to be explained below using an exemplary embodiment and five figures. In the drawings.

DETAILED DESCRIPTION

Figure 1:
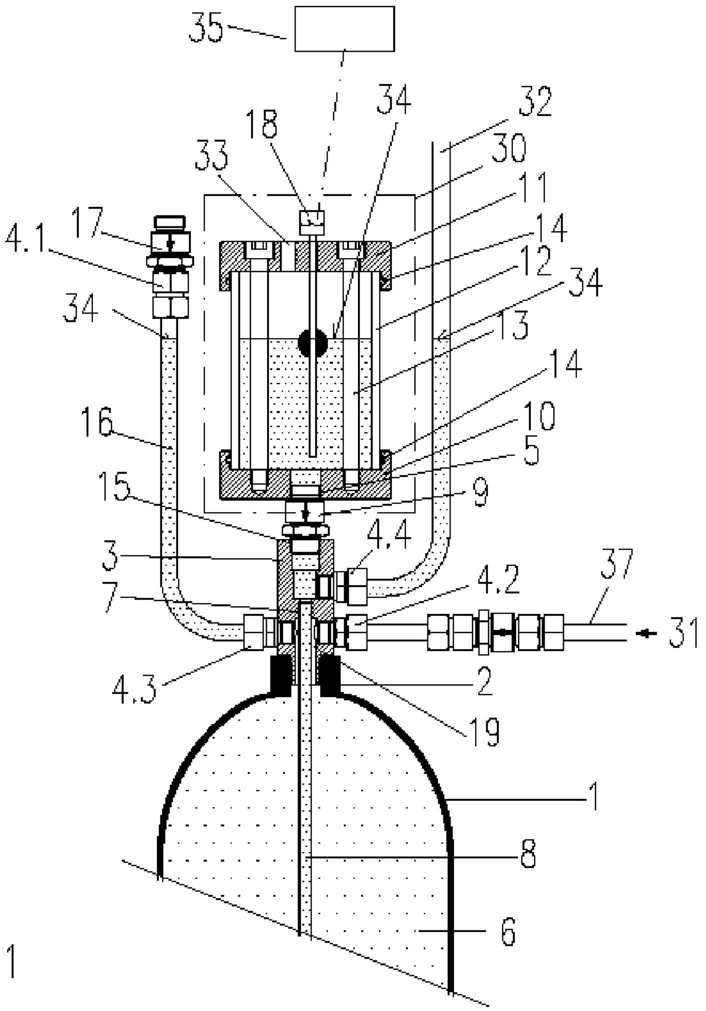
FIG. 1 shows a pressure vessel with compensation tank, shut-off member, and adapter having a connection for the propellant gas, the extinguishing line and the vertical pipe in a schematic illustration.

FIG. 1 shows a schematic illustration of the pressure vessel 1 having the extinguishing agent 6, there being arranged on the pressure vessel the threaded sockets 2 into which the adapter 3 was screwed. The adapter 3 features a riser 8 that leads into the pressure vessel 1 for the extinguishing agent 6. Furthermore connections 4.2, 4.3, 4.4 for the connection for the propellant gas 31, for a vertical pipe 16, and for the extinguishing line 32 are arranged on the adapter 3. The threaded bores 15, 7 serve to attach the connections such as the connection of the shut-off member 9 or the connection of the riser 8. The compensation tank 30 is arranged on the shut-off member 9 that represents a non-return valve using a threaded bore 5. The compensation tank 30 includes the upper part 11 and the lower part 10. Arranged between both parts 10, 11 is a transparent wall 12 through which the filling level 34 can be visually detected. The upper and lower parts 10, 11 are connected to each other by several fastening screws 13 and sealed relative to the transparent wall 12 by seals 14. A filling-level monitoring system 18 is optionally arranged in the compensation tank 30 that is connected to a monitoring facility 35. The monitoring facility 35 can include a fire detection or control panel. When a certain filling level 34 is reached or undercut, a report or an error signal can be generated.

The upper part 11 of the compensation tank 30 exhibits at least one opening 33 that is designed as a bore. The opening 33 ensures the pressure compensation above the filling level 34 in the compensation tank 30.

Filling the extinguishing-agent vessel 1 takes place through the at least one upper opening 33 of the compensation tank 30, the non-return valve 9 and the riser 8. During filling the air escapes from the extinguishing-agent vessel 1 above the liquid level in the vertical pipe 16 through the non-return valve 17, in the compensation tank 30 through the opening 33 that represents a bore, and in the extinguishing line 32 through the extinguishing nozzles that are not shown, so that the filling level 34 in all three units (connected vessels) is at the same height and without pressure. The extinguishing liquid can expand without pressure above the pressure vessel 1 in the compensation tank 30 and can be monitored.

In case an alarm is triggered (triggering state), propellant gas 31 flows via the duct 19 about the riser 8 to the extinguishing agent 6 and drives the latter via the extinguishing line 32 to the fire extinguishing nozzles. When a pressure is applied, the non-return valves 9 and 17 are closed so that no extinguishing agent 6 can exit via these and the volume of the compensation tank 30 is held without pressure.

Figure 2:
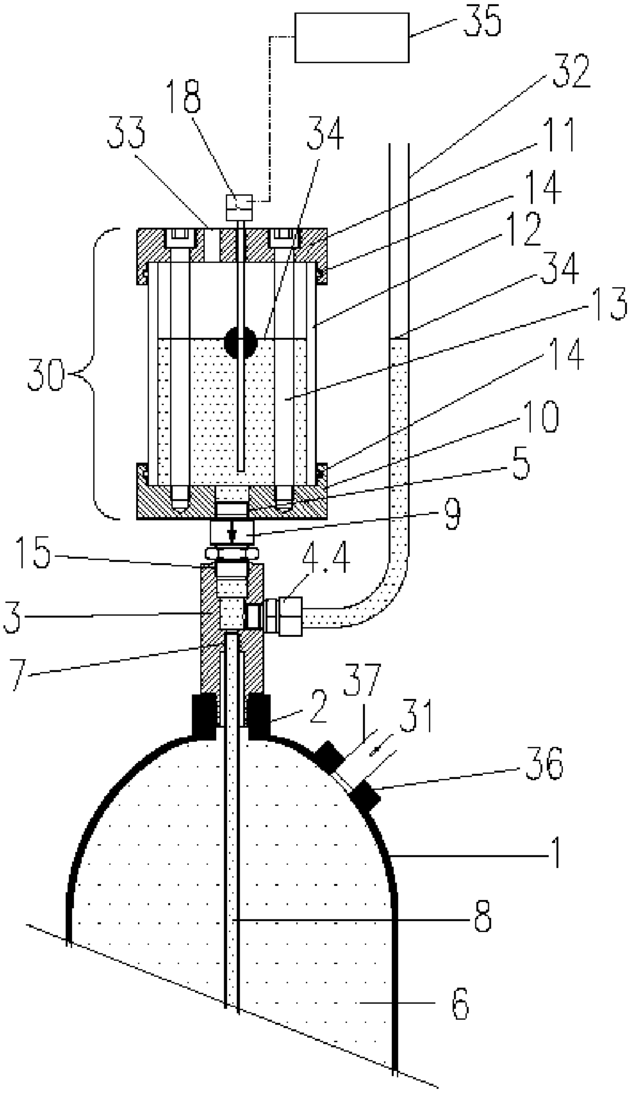
FIG. 2 shows the pressure vessel with compensation tank, shut-off member, and adapter having a connection for the extinguishing line and a vessel connection for propellant gas at the pressure vessel in a schematic illustration.

FIG. 2 shows the compensation tank with the filling-level monitoring system for a pressure vessel 1 where a vessel connection 36 for introducing the propellant gas 31 via the propellant-gas line 37 is arranged, so that the propellant gas 31 drives the extinguishing agent 6 directly via the riser 8 and the adapter 3 into the extinguishing line 32 to the extinguishing nozzles. In the present case, the adapter 3 includes a threaded bore 15 for receiving the shut-off member 9 and a connection 4.4 for the extinguishing line 32 and a threaded bore 7 for receiving the riser 8.

Figure 3:
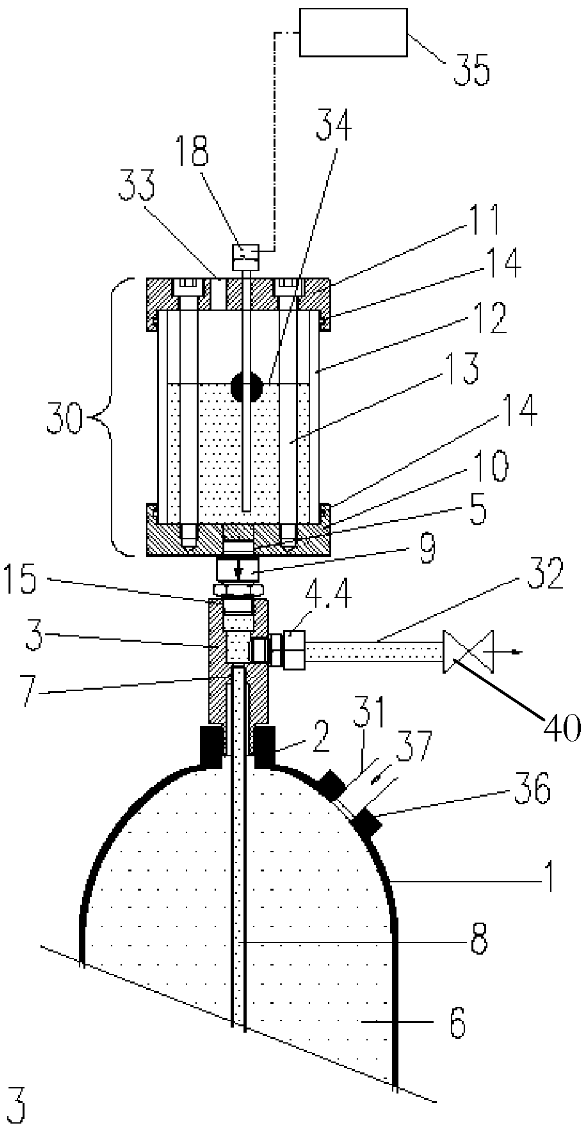
FIG. 3 shows the illustration from FIG. 2 having a horizontal extinguishing line and a valve therein in a schematic illustration.

FIG. 3 essentially shows the same illustration as FIG. 2, the extinguishing line 32 not leading vertically upward to the extinguishing nozzles, but horizontally. So that the extinguishing agent 6 cannot flow off through the horizontal extinguishing line 32, a check valve 40 is arranged in the extinguishing line 32 that does not open until an alarm is triggered and the propellant gas 31 expels the extinguishing agent 6 out of the pressure vessel 1.

Figure 4:
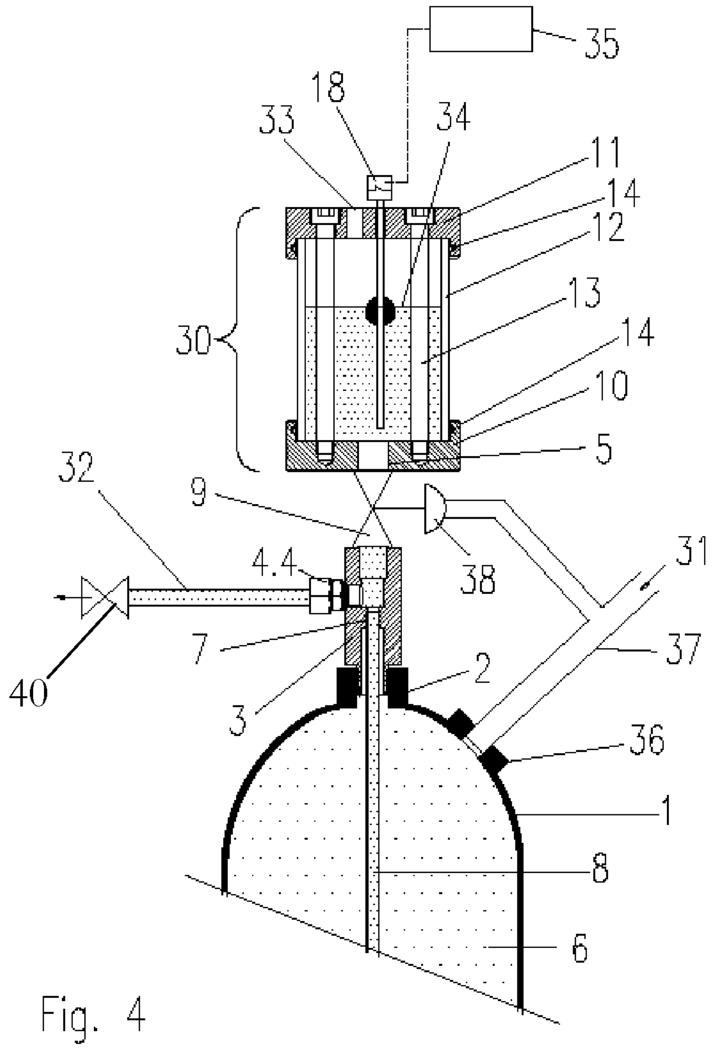
FIG. 4 shows the illustration of FIG. 3, with the shut-off member having a fluid actuator.

FIG. 4 shows an illustration similar to FIG. 3, the shut-off member 9 being driven by a fluid actuator 38. In the present case the fluid actuator 38 is controlled by the propellant gas 31 in the propellant-gas line 37 so that when the propellant gas is supplied, the shut-off member 9 to the compensation tank 13 is closed while the shut-off valve 40 in the extinguishing line 32 is opened so that the extinguishing agent 6 can be expelled to the extinguishing nozzles.

Figure 5:
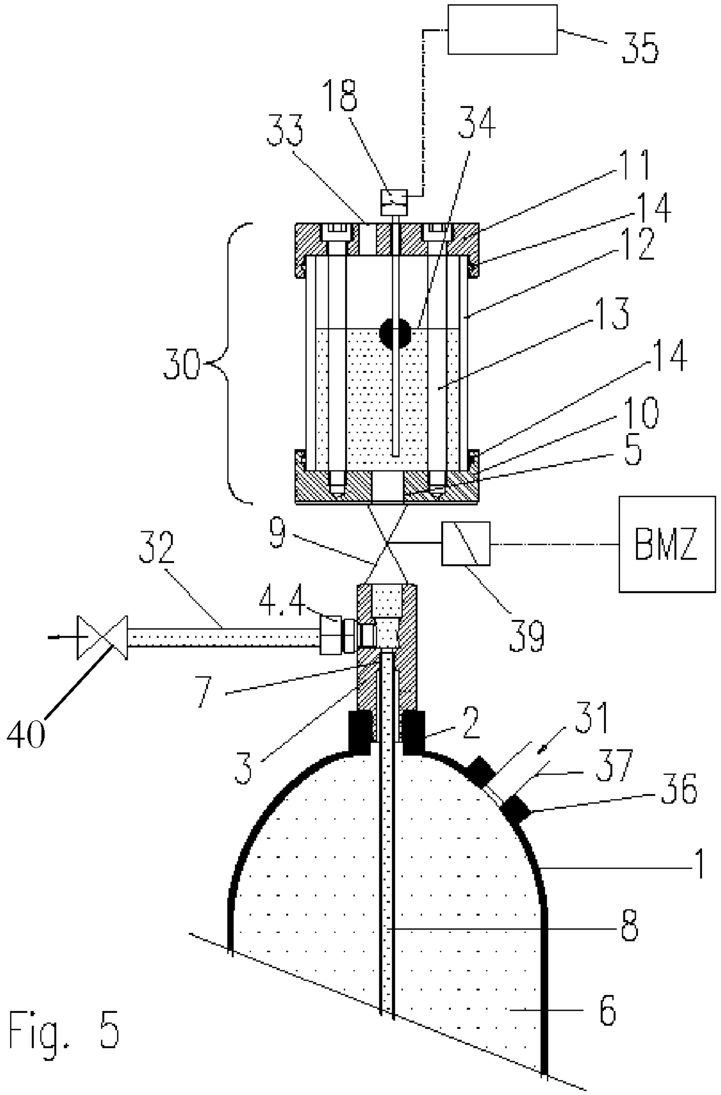
FIG. 5 shows the illustration of FIG. 3, with the shut-off member having an electric actuator.

FIG. 5 shows a solution according to which the shut-off member 9 is closed using an electric actuator 39 as soon as an alarm signal is triggered by the fire detection panel, and the propellant gas 31 flows through the propellant-gas line 37 into the pressure vessel 1 and discharges the extinguishing agent 6 via the extinguishing line 32 to the extinguishing nozzles.

LIST OF REFERENCES SYMBOLS USED

1 pressure vessel for extinguishing agent
2 threaded sockets
3 adapter
4.1 connection for non-return valve (shut-off device)
4.2 connection for introducing a propellant gas (socket)
4.3 connection for pipe vertical (pressure-compensation line)
4.4 connection for extinguishing line
5 threaded bore for connecting the shut-off member 9
6 extinguishing agent
7 threaded bore for receiving the riser 8
8 riser
9 shut-off member
10 lower part
11 upper part
12 transparent wall
13 fastening screw
14 seal
15 threaded bore for receiving the shut-off member 9
16 pipe vertical (pressure compensation line)
17 non-return valve
18 level monitoring
19 duct about the riser 8
30 compensation tank
31 propellant gas
32 extinguishing line
33 opening in 11, for example bore
34 filling level
35 monitoring facility, for example fire detection or extinguishing control panel
36 vessel connection for introducing propellant gas
37 propellant-gas line
38 fluid actuator
39 electric actuator
40 check valve

What is claimed is:

1. A device for compensating a filling level (34) in a pressure vessel (1) for an extinguishing agent, comprising:

the pressure vessel (1) having the extinguishing agent (6);

an extinguishing line (32) connected to the pressure vessel;

a propellant-gas line (37) in communication with the pressure vessel and having a propellant gas (31);

an adapter (3) connected to the pressure vessel (1);

a compensation tank (30) and a shut-off member (9) between the compensation tank (30) and the pressure vessel (1); and wherein in a trigger state, the shut-off member (9) automatically separates a fluid connection between the pressure vessel and the compensation tank when the propellant gas (31) applies a pressure.

2. The device according to claim 1, wherein a system for displaying and for monitoring the filling level (34) is arranged on or in the compensation tank (30).

3. The device according to claim 2, wherein the compensation tank (30) includes at least a partly transparent wall (12).

4. The device according to claim 1, wherein a float having a filling-level monitoring system (18) is arranged in the compensation tank (30).

5. The device according to claim 4, wherein the filling-level monitoring system (18) is connected to a monitoring facility (35).

6. The device according to claim 1, wherein a non-return valve is arranged as the shut-off member (9).

7. The device according to claim 1, wherein the shut-off member (9) is controlled by one of a fluid actuator and an electric actuator (38, 39).

8. The device according to claim 1, wherein the adapter (3) includes a riser (8) and at least one connection (4.4) for an extinguishing line (32) and is arranged between the pressure vessel (1) and the compensation tank (30).

9. The device according to claim 8, wherein there is arranged on the adapter (3) a pipe (16) that is closed by a non-return valve 17 and the non-return valve 17 being situated above the level of the compensation tank or at least at the same level as an upper part of the compensation tank.

10. The device according to claim 1, wherein a connection (4.2) for a propellant-gas line (37) is arranged on the adapter (3).

11. The device according to claim 1, wherein a vessel connection (36) for introducing a propellant gas (31) is arranged on the pressure vessel (1).

12. The device according to claim 1, wherein at least one opening (33) is arranged in the compensation tank (30) above the filling level (34).

* * * * *